United States Patent [19]

Haertling

[11] Patent Number: 4,630,040
[45] Date of Patent: Dec. 16, 1986

[54] VARIABLE COLOR ELECTROOPTIC DISPLAY
[75] Inventor: Gene H. Haertling, Albuquerque, N. Mex.
[73] Assignee: Motorola, Inc., Schaumburg, Ill.
[21] Appl. No.: 481,102
[22] Filed: Mar. 31, 1983
[51] Int. Cl.[4] .............................................. G09G 3/16
[52] U.S. Cl. .................................... 340/763; 340/701; 340/702; 340/704; 340/783; 350/388; 350/390
[58] Field of Search ............... 340/700, 701, 702, 704, 340/705, 716, 103, 980; 350/392, 393, 404, 384, 389, 390, 338, 388, 174, 601; 353/98, 28

[56] References Cited

U.S. PATENT DOCUMENTS

| Re. 28,847 | 6/1976 | Vizenor . | |
|---|---|---|---|
| 2,604,807 | 7/1952 | Woodburn . | |
| 2,616,962 | 11/1952 | Jaffe . | |
| 2,649,029 | 8/1953 | Bacon . | |
| 2,711,667 | 6/1955 | Simjian . | |
| 3,499,704 | 3/1970 | Land et al. | 350/160 |
| 3,512,864 | 5/1970 | Haertling et al. . | |
| 3,531,182 | 9/1970 | Land et al. . | |
| 3,609,002 | 9/1971 | Fraser et al. | 340/324 |
| 3,674,342 | 7/1972 | Castellano et al. | 340/784 |
| 3,737,211 | 6/1973 | Cutchen et al. . | |
| 3,783,184 | 1/1974 | Ernstoff et al. . | |
| 3,785,721 | 1/1974 | Harsch . | |
| 3,799,647 | 3/1974 | Luft | 350/388 |
| 3,806,227 | 4/1974 | Greubel et al. . | |
| 3,813,144 | 5/1974 | Kumada et al. | 350/404 |
| 3,915,554 | 10/1975 | Maezawa . | |
| 3,923,370 | 12/1975 | Mostrom . | |
| 3,932,861 | 1/1976 | Bull . | |
| 3,938,878 | 2/1976 | Fox . | |
| 3,944,330 | 3/1976 | Tsunoda et al. . | |
| 3,955,190 | 5/1976 | Teraishi . | |
| 3,960,438 | 6/1976 | Bonne et al. . | |
| 3,990,770 | 11/1976 | Carl et al. . | |
| 3,997,690 | 12/1976 | Chen | 350/390 |
| 4,015,422 | 4/1977 | Haaften | 340/815.2 |
| 4,019,808 | 4/1977 | Scheffer . | |
| 4,027,949 | 6/1977 | Lobb . | |
| 4,054,368 | 10/1977 | Krueger et al. . | |
| 4,097,128 | 6/1978 | Matsumoto et al. . | |
| 4,097,130 | 6/1978 | Cole, Jr. . | |
| 4,167,113 | 9/1979 | Mann | 340/705 |
| 4,190,832 | 2/1980 | Mohler | 340/705 |
| 4,222,638 | 9/1980 | Robert | 350/96.14 |
| 4,232,948 | 11/1980 | Shanks . | |
| 4,239,349 | 12/1980 | Scheffer | 350/347 R |
| 4,241,339 | 12/1980 | Ushiyama | 340/702 |
| 4,294,518 | 10/1981 | O'Connor et al. | 350/357 |
| 4,379,621 | 4/1983 | Ikedo et al. | 350/392 |

FOREIGN PATENT DOCUMENTS 2232770 1/1975 France .
1358973 7/1976 Switzerland .

OTHER PUBLICATIONS

C. E. Land, Ferroelectric Ceramic Electrooptic Materials and Devices, IEEE, vol. 57, May 1969.
Article on PLZT Electrooptic Ceramics and Devices by Gene H. Haertling, Copyright 1981, Motorola, Inc., pp. 274-277.
Article on Display Applications of PLZT Ceramics by J. R. Maldonado, D. B. Fraser, and A. H. Meitzler, Bell Laboratories.
Article on "International Handbook of Liquid Crystal Displays 1975-1976" by Ovum Ltd., published in 1975 (London, GB), p. 52, see p. 52, paragraph 8.3 by Martin Tobias.

Primary Examiner—Gerald L. Brigance
Assistant Examiner—Jeffery A. Brier
Attorney, Agent, or Firm—Charles L. Warren; Donald B. Southard

[57] ABSTRACT

An electrooptic color display for displaying selectable indicia includes a ferroelectric ceramic element, such as a PLZT material, first and second polarizers on each side of the element, and a mechanism for selectively inducing a transverse electric field at selectable areas on the element, said areas corresponding to the indicia. The electric field can be produced by applying a voltage to transparent interleaved electrodes on one or both surfaces of the ceramic element. These areas produce spectrally selective phase retardation which causes the color of the indicia to be different from that of the background color. Preferably a separate retardation element which may be fixed, variable, or a combination of both, is disposed between the polarizers to provide a fixed color bias that determines the background color. This invention contemplates transmissive, reflective, and transflective color displays.

33 Claims, 42 Drawing Figures

TRANSMISSIVE COLOR DISPLAY

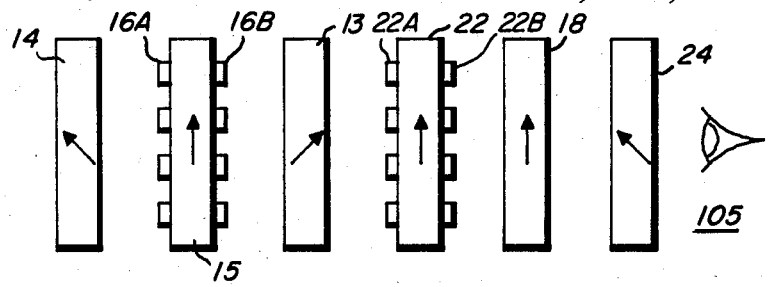
Fig. IE
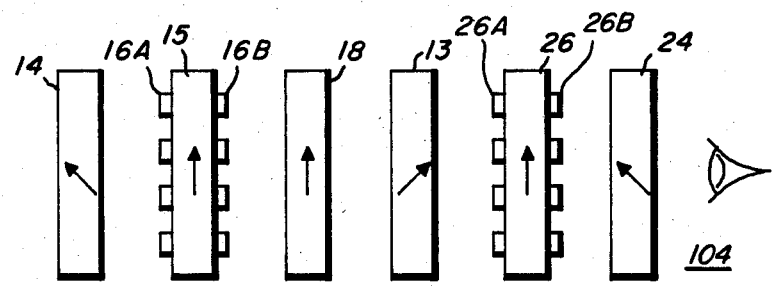
Fig. IF
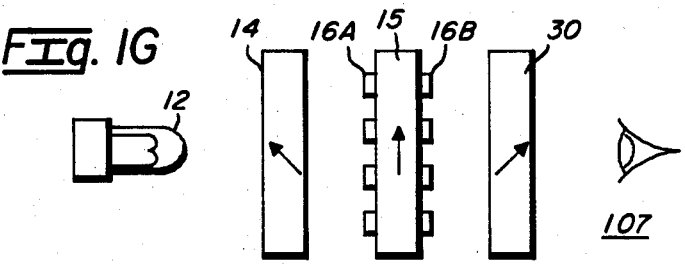
Fig. IG
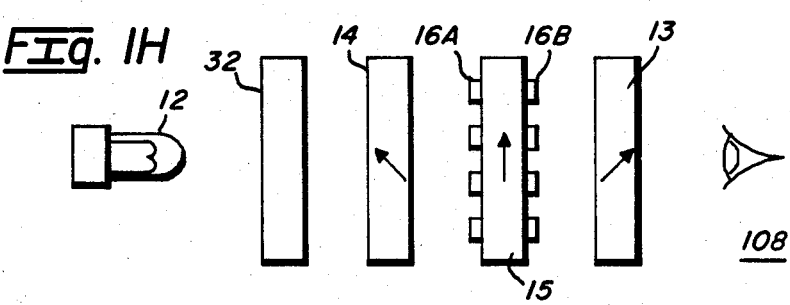
Fig. IH

REFLECTIVE COLOR DISPLAY

TRANSFLECTIVE
COLOR DISPLAY

301

302

303

304

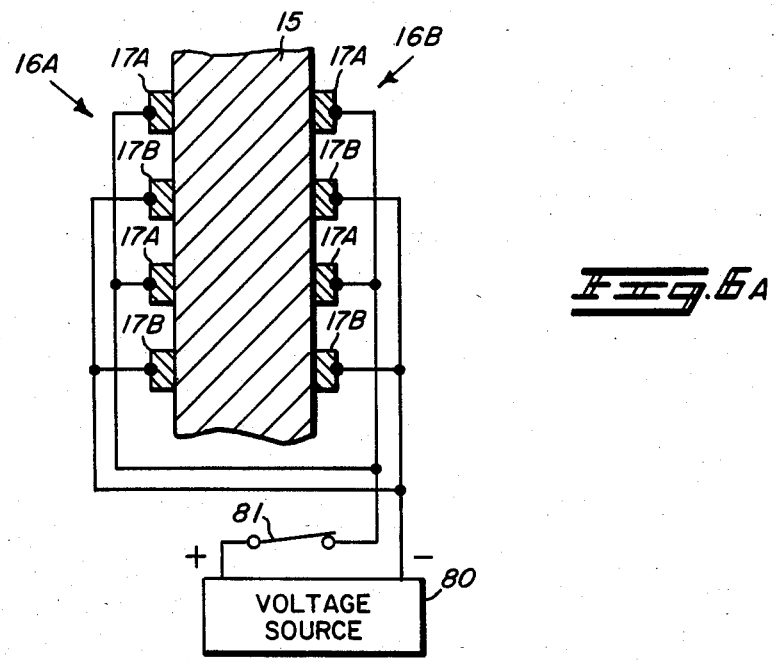
_Fig. 6A_
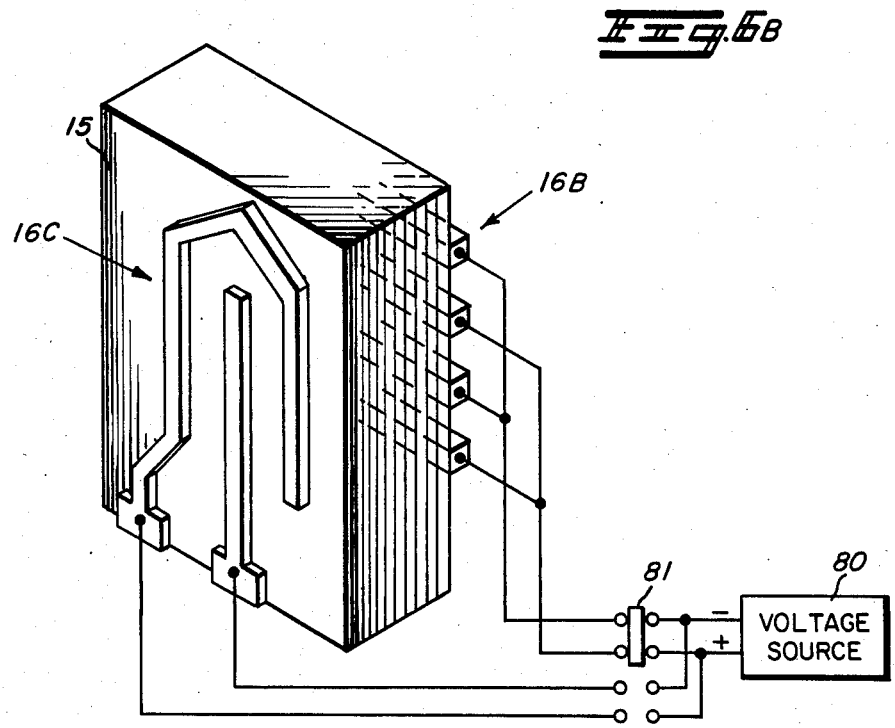
_Fig. 6B_

VARIABLE COLOR ELECTROOPTIC DISPLAY

BACKGROUND OF THE INVENTION

The present invention relates in general to color electrooptic displays and, more particularly, to variable color displays which utilize electrooptic materials together with polarizers and a retardation plate in order to achieve an optimum combined effect of high contrast and brightness, wide viewing angle, and relatively low operating voltage requirements. More specifically, the invention is directed to a color display in which the color of the displayed indicia can be selected to be one of two or more predetermined colors, and is further directed to a color display wherein the color of the displayed indicia and of the background can be continuously varied.

Ferroelectric ceramic materials, such as PLZT, are optically transparent and have electrically-controllable light modulation properties. In these ferroelectric ceramic materials, light modulation may be produced by two modes: (1) light scattering, which has not proven to be desirable for displays because the achievable contrast ratios are too low, and (2) optical birefringence, also known as the electrooptic effect, which is a material phenomenon wherein very high contrast ratios on the order of 5,000 to 1 are attainable.

In evaluating these approaches, it is helpful to distinguish between the materials utilized; for instance, whether the material utilized is a single crystal structure or a ceramic material. This is important because single crystal materials are different from the ceramic materials in that ceramic materials are composed of random aggregates of microscopic crystallites, on the order of 1 to 15 micrometers in average diameter, intimately bonded or sintered together to form a dense solid material. Light scattering effects are minimal to non-existent in small grain-sized materials (less than 2 microns) whether the material used is of the memory type or the non-memory type. However, birefringence is observable in both large grain size (greater than 2 microns) non-memory materials, and small grain size non-memory materials; but birefringence in ceramic memory materials is useful only in small grain size types. Optical transparency is enhanced when large grain size ceramic material is utilized.

It is known that conductive electrodes can be disposed on ceramic material to induce an electric field. The electrical field vector, which is determined by the placement of the electrodes and the polarity of the applied voltage, defines the internal polarization direction of the ceramic material, i.e., the atomic unit cell elongation.

The PLZT ceramics are optically birefringent, uniaxial materials, which are substantially transparent in the wavelength region from 0.37 to 6.5 micrometers. The PLZT plates are defined as uniaxial because they possess one unique direction, i.e., the polarization direction, along which light travels at a different velocity relative to the other two orthogonal directions. It is important to recognize that PLZT ceramics possess optically uniaxial properties on a microscopic scale and also on a macroscopic scale when polarized with an electrical field. In uniaxial crystals, there is one unique symmetry axis, the optic axis, which is colinear with the ferroelectric polarization vector in the PLZT ceramics and which possesses different optical properties than the other two orthogonal axes. That is, light traveling in a direction along the optic axis, and vibrating in a direction perpendicular to the optic axis, encounters a different index of refraction than the light traveling in a direction at right angles to the optic axis and vibrating parallel to the optic axis. The difference in velocities, or indices of refraction, is known as the birefringence or $\Delta n$, (where $n=c/v$ where $c=$velocity of light in a vacuum, and v is the velocity of light along a given crystalline direction). Stated another way, the absolute difference between the two indices is defined as the birefringence, i.e., $n_E - n_O = \Delta n$. The inherent optical activity and ability to cause optical retardation or phase delay is proportional to the $\Delta n$ of the material. On a macroscopic scale, $\Delta n$ is equal to zero before electrical poling and has some finite value after electrical poling, depending on the composition of the ceramic material utilized and the degree of polarization.

The $\Delta n$ value is a meaningful quantity in that it is related to the optical phase retardation in the ceramic material. For certain compositions within the PLZT materials, i.e., ferroelectric non-memory type ceramic material such as 9/65/35 (9% La, 65% $PbZrO_3$ and 35% $PbTiO_3$), $\Delta n$ is electrically induced and is proportional to the square of the electrical field strength. This results in a quadratic ceramic material, since $\Delta n = kE^2$. The subject matter of the present patent application preferably utilizes such ceramic materials.

These ferroelectric ceramic materials, by virtue of their natural cubic symmetry, do not possess permanent polarization and are not optically birefringent in their quiescent state. Such PLZT ceramic materials contribute no optical retardization to an incoming light beam. However, when an electrical field is applied to the PLZT ceramic materials, electrical polarization and birefringence is induced in the ceramic materials, and optical retardation occurs. A linearly polarized light, on entering the electrically energized ceramic material, is resolved into two perpendicular components, whose vibration directions are defined by the crystallographic axes of the crystallites acting as one optical entity. Because of the different refractive indices, $n_E$ and $n_O$ (i.e., the respective index along the propagation direction and the respective index perpendicular to the propagation direction), the propagation velocity of the two components will be different within the ceramic material and will result in a phase shift called retardation. The total retardation $\Gamma$ is a function of both $\Delta n$ and the optical path length t (i.e., the thickness of the ceramic PLZT plate), according to the relation $\Gamma = \Delta n \times t$. When sufficient voltage is applied to the PLZT ceramic material, a half-wave retardation is achieved for one component relative to the other. This results in the vibration direction of the linearly polarized light being rotated by 90 degrees. Switching from the state of zero retardation to half-wave retardation will create a light shutter when the plate is placed between "crossed" polarizers, i.e. polarizers having orthogonal polarization axes.

Displays have been used in a variety of applications including the visual presentation of information in vehicles. For example, vehicular "head-up" display systems have been disclosed wherein the desired information is displayed in the line of sight of the person controlling the vehicle which may comprise an automobile or airplane. Such systems suffer from a multiple image reflection problem in which the observer sees one or more secondary images of the displayed information which is offset from the primary desired image. The secondary images result from refractions in the viewing screen which may comprise the windshield in an automobile.

SUMMARY OF THE INVENTION

It is an object of this invention to provide a color electrooptic display including indicia having a color that varies in response to the magnitude of an induced electric field.

Another object of the present invention is to provide a color electrooptic display including indicia having a color which is selectable by controlling the orientation of an applied electric field.

A further object of this invention is to provide a color electrooptic display wherein the color of the indicia and the color of the background are both continuously variable.

Another object of the present invention is to provide a color electrooptic display utilizing a fixed retardation plate to provide a fixed color bias.

Yet another object of the present invention is to provide a color electrooptic display utilizing a PLZT retardation plate to provide a continuously variable color bias responsive to an applied electric field.

It is still another object of this invention to provide a color electrooptic display utilizing a variable PLZT retardation plate and a fixed retardation plate in combination.

Another object of this invention is to provide a color electrooptic display utilizing different electrode orientations on each of the major surfaces of a PLZT plate, the electrodes producing different colored indicia.

It is another object of the present invention to provide a variable color electrooptic display utilizing an integral light modulation (intensity) control.

It is another object of this invention to provide a color electrooptic display utilizing a color leak polarizer to yield a fixed color display.

Yet another object of the present invention is to provide a color electrooptic display utilizing a transparent color filter yielding a fixed color display.

Another object of the present invention is to provide a color electrooptic display capable of operating in a reflective mode utilizing ambient light.

A further object of this invention is to provide a color electrooptic display capable of operating in a transflective mode utilizing both a back light source and ambient light simultaneously.

A still further object of the present invention is to provide a color electrooptic display capable of operating in a transmissive mode utilizing a back light source.

Another object of the present invention is to provide a variable color electrooptic ferroelectric ceramic display which is of low cost and can be readily and easily manufactured.

A further object of this invention is to provide a color electrooptic display in which different colors are generated by utilizing electrodes with different spacings to produce electric fields with different magnitudes.

Another object of the present invention is to provide a color electrooptic projection display system wherein colored indicia can be projected onto a viewing screen.

An additional object is to provide a color electrooptic head-up display which substantially overcomes multiple image reflection problems.

A more specific object is to provide a color display by utilizing a ferroelectric ceramic element which is substantially transparent when no electric field is applied.

This invention is directed to electrooptic color selectable and color variable displays in which the colors are selected or varied by means of controlling the magnitude and orientation of an applied electric field.

One embodiment of a color display according to the invention includes a ferroelectric ceramic plate disposed between first and second polarizers. The ceramic plate is substantially transparent when no electric field is applied. A means is provided for selectively inducing an electric field at selectable areas on at least one surface of the ceramic element wherein the areas define the indicia to be displayed. The electric field is oriented transverse to the optical axis of the display and is of a magnitude sufficient to cause the plate to produce spectrally selective phase retardation of light passing through said areas. Because polarized light is utilized, the phase shifting of light corresponding to the indicia results in the indicia having a color different from the non-phase shifted light.

A retardation plate is preferably placed in optical series between the polarizers to provide a spectral or color bias. The retardation may comprise a fixed plate, a ferroelectric ceramic plate which can provide variable retardation in response to an applied electric field, or both. The polarizers may be optically crossed or in parallel depending on the type of display desired.

The electric field may be induced by applying a voltage across electrode patterns disposed on one or both surfaces of the ceramic plate. For example, the electrode patterns can consist of transparent interleaved fingers alternately connected to produce electric fields between each pair of fingers. Identically disposed and aligned electrode patterns on each side of the ceramic plate can be advantageously operated in electrical parallel to produce identical electric fields on each surface thereby permitting the use of a lower voltage to achieve a given phase retardation as compared to the utilization of only one such electrode pattern on one surface. Selectable phase retardation which corresponds to selectable colors can be obtained by applying a controllable voltage, or by using varying spacings between fingers in an electrode pattern.

In another embodiment of this invention, such a color ferroelectric display is integrally combined with a light shutter or modulator to produce a variable color display with controllable intensity.

This invention further contemplates a projection type display wherein the image is projected, either same size or enlarged, upon a viewing surface. A substantially transparent ferroelectric plate disposed in the line of sight in a vehicle and utilized as the viewing surface can provide a head-up display.

BRIEF DESCRIPTION OF THE DRAWINGS

The features of the present invention which are believed to be novel are set forth with particularity in the claims. The invention together with embodiments and further objects and advantages thereof, may be best understood by reference to the following description when taken in conjunction with the accompanying drawings, in which like reference numerals refer to like elements in the several figures, and in which:

FIGS. 1A through 1H are diagrammatic views illustrating transmissive color displays according to the present invention.

FIGS. 6A and 6B illustrate the connection of the interleaved electrodes on an electrooptic element with a voltage source.

GENERAL DESCRIPTION OF THE INVENTION

Figure 1A:
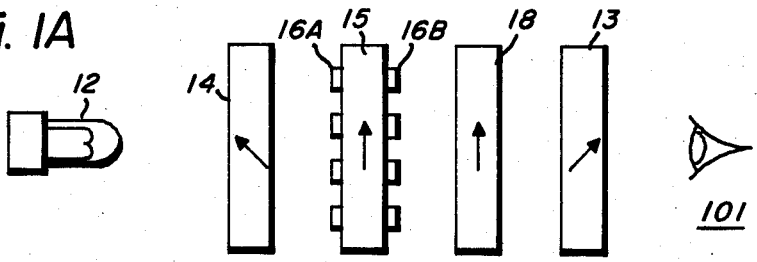

When a transverse electric field in excess of that required to achieve half wave retardation is applied to a PLZT plate disposed between crossed polarizers, spectral (color) selectivity will generally occur. If monochromatic or near monochromatic light impinges on the display, the observed effect is a repeating series of light maxima (half wave phase retardation for crossed polarizers) and light minima (full wave phase retardation for crossed polarizers) according to a sine squared function of voltage. The effect holds true for all of the optical wavelengths (400 nm to 760 nm) and even into the infra-red; however, the voltage required to produce half-wave phase retardations ("ON" condition for crossed polarizers) and full wave phase retardations ("OFF" condition for crossed polarizers) for a given wavelength increases with increasing wavelength.

For example, the voltage required for an "ON" condition for red light (760 nm) may be approximately 33% higher than that required for the "ON" condition of blue (400 nm) light. When all of these wavelengths are mixed together as exists in ordinary polychromatic or white light, and used to illuminate a display, the net result is the generation of color in the display which depends on the applied voltage. This occurs since at any given voltage equal to or greater than that required to produce full wave cancellation ("OFF" condition) of the shortest wavelength (blue), one observes the color produced as a result of subtracting the cancelled wavelength from the spectrum; thus, subtracting blue from white generates a yellow color. Other examples are: green from white produces magenta and red from white produces cyan (blue-green). The color observed is usually a compound color consisting of several wavelengths. It should be recognized that yellow, magenta and cyan are compound colors and are, in fact, the three subtractive primary colors used in commercial photographic color processes.

If it is not desirable to apply sufficient voltage to the PLZT plate of the color display in order to achieve the colors solely by means of the phase retardation in the PLZT plate itself, an optical bias may be employed such as by placing a separate phase retardation plate in optic series with the display. This reduces the voltage required to achieve a given color because the retardation now required to be generated in the PLZT plate itself is considerably less since the retardation plate supplies a portion of the total phase change needed. The phase retardation (wave) plate is located between the two polarizers and is preferably positioned such that the phase retardation direction is 45° to the polarization vector or priviledged direction of the polarizers. A commercially available wave plate which can be used in this invention is a full-wave red plate such as a P-008 560 nm full wave retarder made by Polaroid Corporation which produces approximately 560 nm of phase retardation with crossed polarizers. Other wavelength plates such as ¼, ½, or ¾-wave plates as well as other color plates are also available although wave plates between ½ and 1 wavelength are preferred. In fact, several wave plates may be employed simultaneously in optical series, such that the total retardation is the sum of the separate phase retardations, provided all of the phase retardation directions of the separate wave plates are aligned. If any two wave plates of equal retardation are aligned such that their retardation direction are 90° with respect to each other, then their retardation effects will exactly cancel each other. Therefore, it can be seen that different "optical bias" retardation colors can be produced from the various wave plates depending on the number of plates used, on their total retardation and on their orientation with respect to the preferred direction of the polarizers.

In operation, the retardation of the indicia controlling PLZT plate will either add to or subtract from the optical bias color produced by the wave plate(s). For example, if a full wave red (magenta) plate is used and oriented such that the phase retardations add, then the display segments controlled by electrodes on the PLZT plate will appear blue or blue-green on a background of red; and if it is oriented such that the phase retardations subtract, then the display segments will appear yellow on a background of red.

The optical bias color wave plate can consist of a highly stretched, transparent plastic film on an isotropic plastic backing for mechanical ruggedness. However, other materials such as natural crystals (calcite, mica) and other means such as polished electroded PLZT plates, could be used. Economic reasons usually rule out natural crystals. A PLZT plate (used as an optical bias retardation plate) comprises an improvement over the plastic wave plates since the retardation in the PLZT plate can be continuously varied by means of a variable control voltage used to induce a variable electric field. Using a PLZT retardation plate allows one to simultaneously change the background color of the display as well as the color of the segments by varying a control voltage.

Using a PLZT phase retardation plate has the additional advantage of increasing the angle of viewability of the display without significantly altering the color of the display. When a plastic retardation plate is employed, one can observe a noticeable change in display color when the viewing angle of the display changes from normal-to-the display, to 40° from normal-to-the-display. This is due to the additional birefringence (retardation) the light encounters in traversing through the retardation plate at angles greater than about 40°. In fact, there is a continual change in the observed color as the viewing angle is changed from 0° to 90°. Although this is true for any retardation plate used, it has been observed that the effect is greatly diminished when a PLZT retardation plate is employed. This is due to the significantly higher index of refraction of the PLZT ($n=2.5$) as compared to the plastic wave plate commercially available ($n=1.5$). As the index of refraction in a retardation plate increases, the incident light rays are more strongly refracted toward the display normal thereby decreasing the magnitude of perceived color change with the viewing angle. When a PLZT retardation plate is used, color integrity is maintained up to approximately 80° from the display normal. In principle, any high index of refraction ($n>2.0$), transparent, retardation material may be used to advantage in reducing the color viewing angle criticality; however, PLZT and perhaps a crystalline titanium dioxide composition are particularly advantageous because of their commercial availability and their very high indices of refraction; i.e. 2.5 and 2.6, respectively.

This invention is particularly, but not exclusively, useful in creating color displays having indicia whose perceived color can be controlled by varying an electric field to control optical phase retardation. Indicia may be defined by electrode elements or segments capable of displaying alpha-numeric characters, complete characters, graphics, or other symbols or shadings which can be used to communicate information. This invention can, of course, also be used generally as a voltage controllable color filter.

This invention contemplates embodiments having:

(a) color indicia on a fixed, different colored background wherein the color of the indicia can be selected to be one of two or more predetermined colors (usually two distinct colors such as yellow and blue) or the color of the indicia can be continuously varied.

(b) color indicia on a different colored background wherein the color of the indicia and the color of the background can both be simultaneously and continuously variable.

(c) color indicia on a dark or black background; wherein the color of the indicia can be continuously varied.

(d) a color display in which the brightness of the display can be continuously varied from OFF to ON through the use of a second stage in optical series with one of the above embodiments wherein the second stage operates as a light modulator independent of the color of the display.

Two other methods of achieving color in PLZT displays are possible, but can generate only one color in a given configuration; these include:

(e) a color display produced through the use of a special polarizer or polarizers which permits a spectral (color) transmission in an "OFF" condition (crossed polarizers). This effect is due to a selected polarization inefficiency of the polarizer at a given optical wavelength; i.e., a spectral "leak", such that even when the polarizers are crossed for the extinction of light, a given wavelength is still transmitted. In general, only one color can be generated in a display for a given set of selected polarizers. This effect is usable for either crossed or parallel polarizers producing either light (white) indicia on a colored background or colored indicia on a light (nearly neutral) background, respectively.

(f) a fixed color PLZT display which uses a transparent, color filter in combination with a non color display. In this case, the filter is preferably located outside of the polarizer-PLZT-polarizer assembly in order to avoid introducing any unwanted birefringence (retardation) to the display from the filter itself. Residual stress, leading to residual birefringence, is common to the less expensive, plastic color filters.

DETAILED DESCRIPTION OF THE PREFERRED EMBODIMENTS

Referring now to the drawings, FIGS. 1A through 1H illustrate embodiments 101–108 of transmissive-type displays. Generally, the transmissive displays utilize a back polychromatic light source 12, and crossed polarizers 13 and 14 disposed on either side of an electrooptic element 15 which is preferably a polished PLZT plate. The electrooptic element 15 preferably has identical transparent electrode patterns 16a and 16b in precise alignment on each major surface. The electric fields induced by the electrodes define the indicia to be displayed. Although it is advantageous to induce identical electric fields on each surface of the plate 15 with electrodes 16a and 16b, as will be explained below with respect to FIG. 6A, an electrode pattern on only one surface could be used to induce an electric field for controlling the display and color of the indicia. Also, non-transparent electrodes could be used if same can be disposed to yield acceptable quality observed indicia.

Polarizers 13 and 14 are preferably disposed so that the polarization orientation of each polarizer is about 45° with respect to the induced electric field and is about 90° with respect to each other. A voltage source (see FIG. 6A) is utilized to induce an electric field in plate 15 transverse to the optic axis of the display by applying a voltage to selected portions or segments of the electrode patterns 16a and 16b.

In FIG. 1A, transmissive display 101 employs polarizer 14 so that the light emitted from light source 12 is polarized prior to striking PLZT plate 15. The linearly-polarized light enters the PLZT plate 15, and when no voltage is applied to the associated electrode patterns 16a and 16b, the light proceeds substantially undisturbed through the PLZT plate 15 and exits the PLZT plate 15, that is, plate 15 is substantially transparent.

The polarized light exiting the PLZT plate then strikes a fixed phase retardation plate 18 which either increases or decreases the phase of a spectral portion of the light passing through it. The light exits the retardation plate and strikes polarizer 13. Since polarizers 14 and 13 are crossed, essentially no light will exit polarizer 13 unless a change in phase of the light occurs between the polarizers.

For example, a full wave red retardation plate 18 with its preferential or vector orientation parallel to the electric field applied to plate 15, as indicated by the arrow on plate 18, would cause the red spectral portion of the light to be phase changed and hence that spectral portion would pass through polarizer 13 to yield a red background when no voltage is applied to the electrodes. Applying voltage to the electrodes 16a and 16b creates an electric field at selected areas (the indicia) of the PLZT plate 15 which causes phase retardation to light passing through those areas on the plate. Thus the light corresponding to the desired indicia undergoes a change of phase induced by the PLZT plate. The non-phase changed light that exits the PLZT plate appears as a red color as explained above; the portion of light having its phase changed by the PLZT plate (i.e. corresponding to the indicia) appears as a different color such as blue or yellow. Therefore, this exemplary embodiment comprises a display which would have a completely red background in the OFF condition (no electric fields applied to the PLZT plate) and different colored indicia, such as blue, adjacent a red background in the ON condition.

Of course, other background colors can be obtained by selecting a different retardation plate 18. For a given retardation plate, the color of the indicia is determined by the magnitude and polarity of the phase change induced by the PLZT plate; hence, the color of the indicia can be controlled by the magnitude and polarity of voltage applied to the electrodes. The fixed retardation plate 18 could be disposed on either side of the PLZT plate. Also other background and indicia colors can be generated with parallel, instead of crossed polarizers 13 and 14.

Figure 1B:
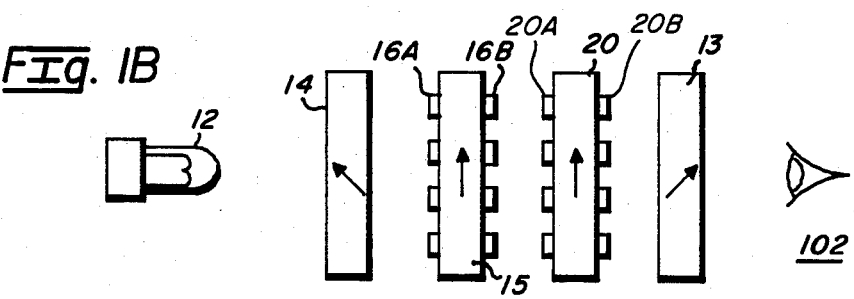

Embodiment 102 in FIG. 1B differs from display 101 in that a variable phase retardation plate 20 is used in place of fixed retardation plate 18. Plate 20 preferably comprises a PLZT plate with electrodes 20a and 20b disposed to induce a uniform electric field. By controlling a voltage applied to these electrodes to induce a correspondingly variable electric field, the phase retardation due to PLZT plate 20 can be selectively varied. By this method continuously variable colors for both the background and indicia may be achieved without physically interchanging a different phase retardation plate 20.

Figure 1C:
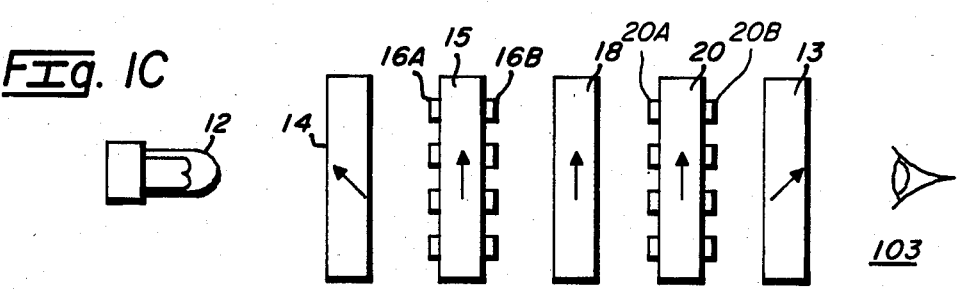

In FIG. 1C, the optical bias is achieved by the combination of a variable PLZT retardation plate 20 and a fixed retardation plate 18. By electronically exciting the electrode patterns 20a and 20b on the PLZT plate 20, one can either add to or subtract from the retardation of plate 18 to achieve variable color combinations.

Figure 1D:
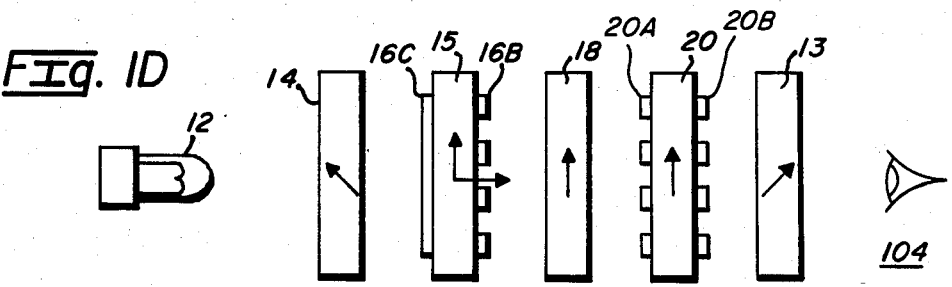
Figure 2A:
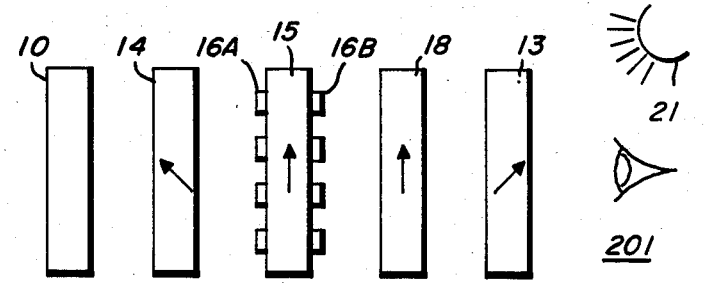
FIGS. 2A through 2H are diagrammatic views illustrating reflective color displays according to the present invention.
Figure 2B:
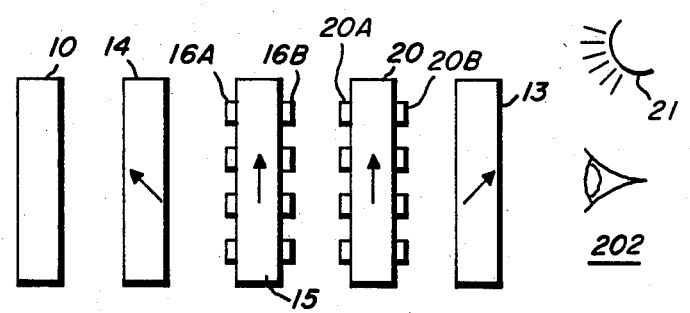
Figure 2C:
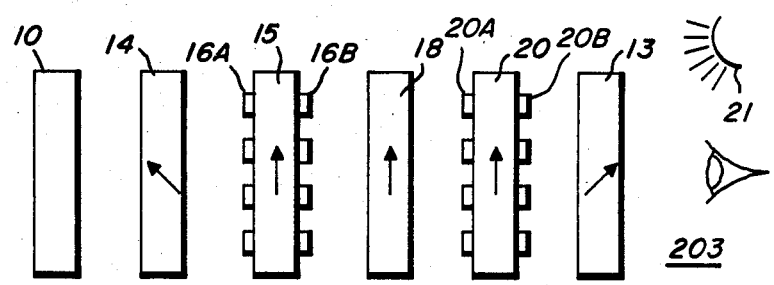
Figure 2D:
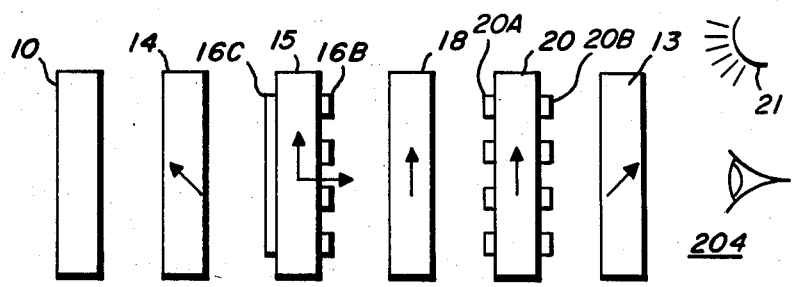
Figure 2E:
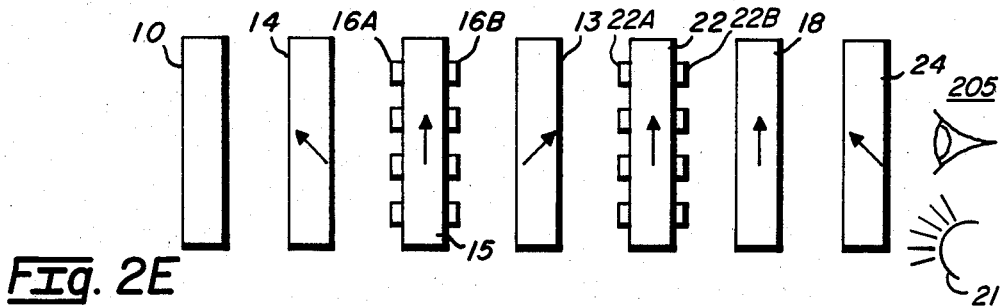
Figure 2F:
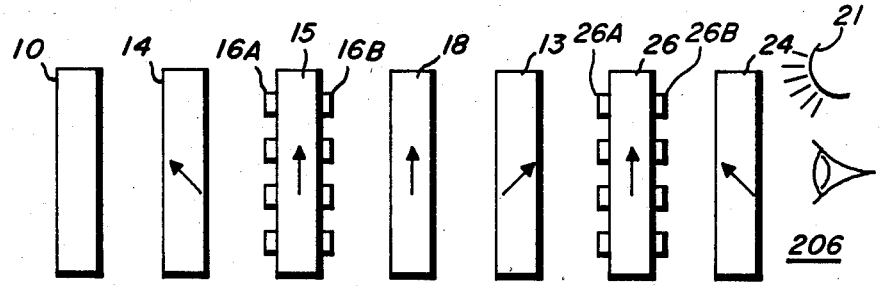
Figure 2G:
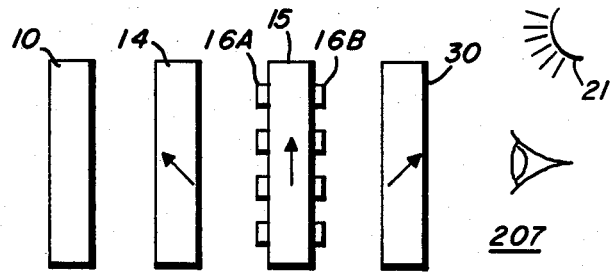
Figure 2H:
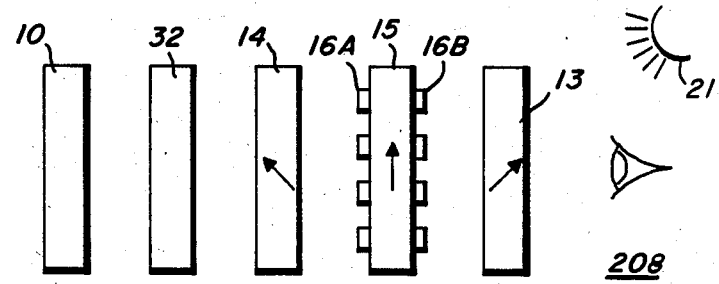
Figure 3A:
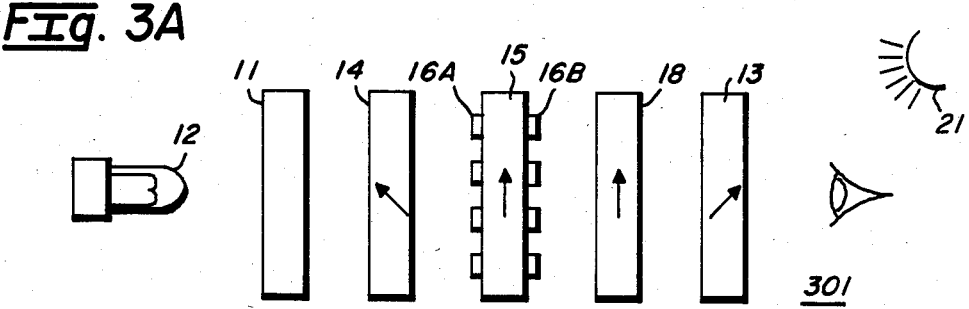
FIGS. 3A through 3H are diagrammatic views illustrating transflective color displays according to the present invention.
Figure 3B:
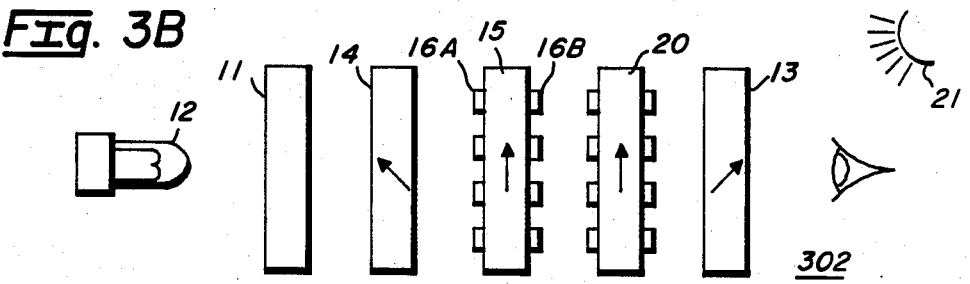
Figure 3C:
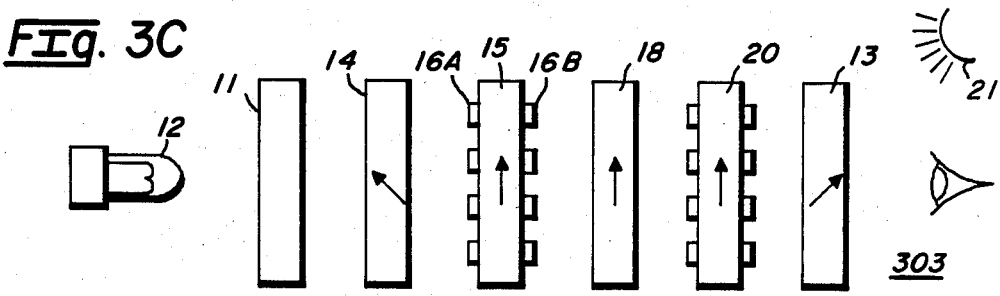
Figure 3D:
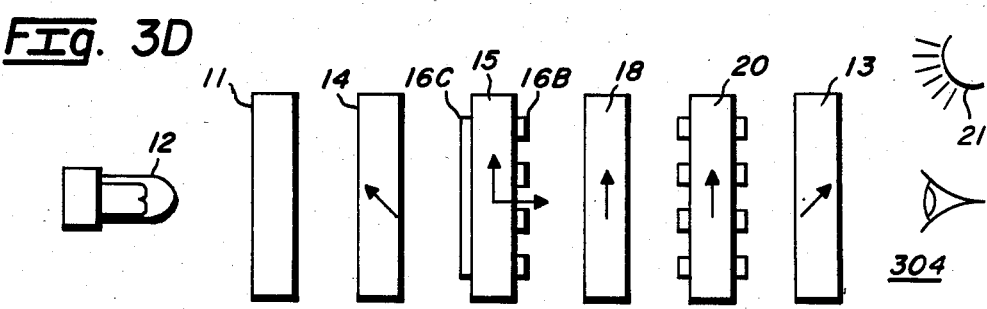
Figure 3E:
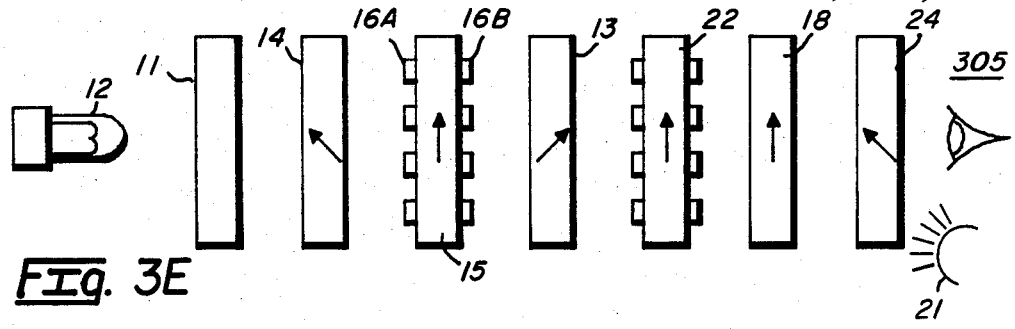
Figure 3F:
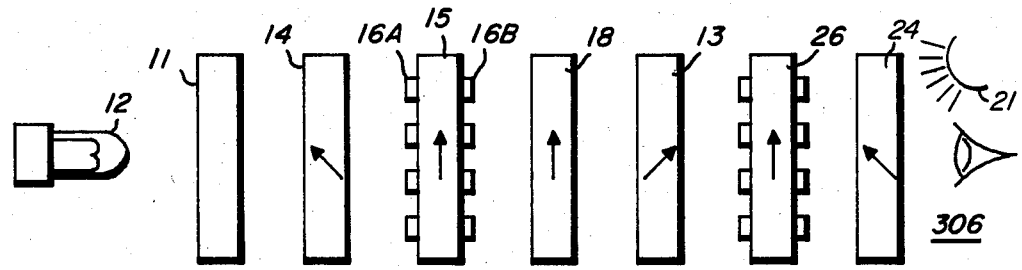
Figure 3G:
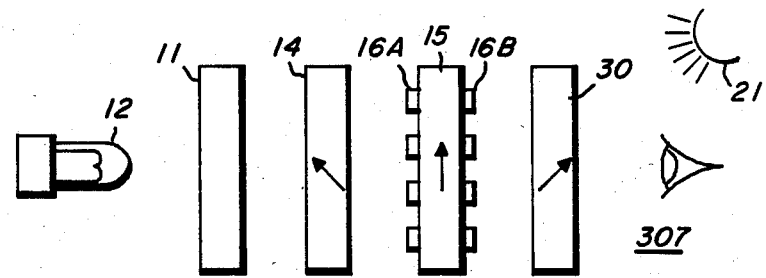
Figure 3H:
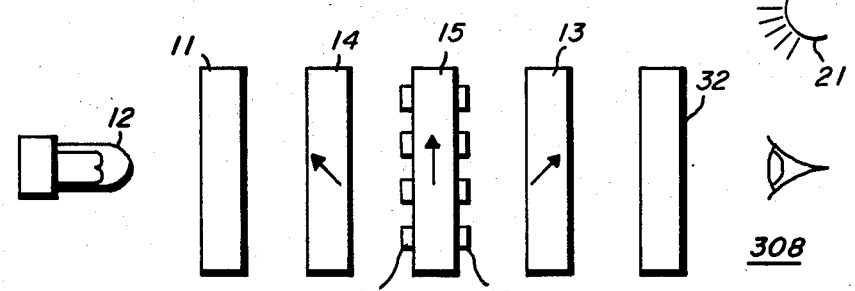
Figure 5:
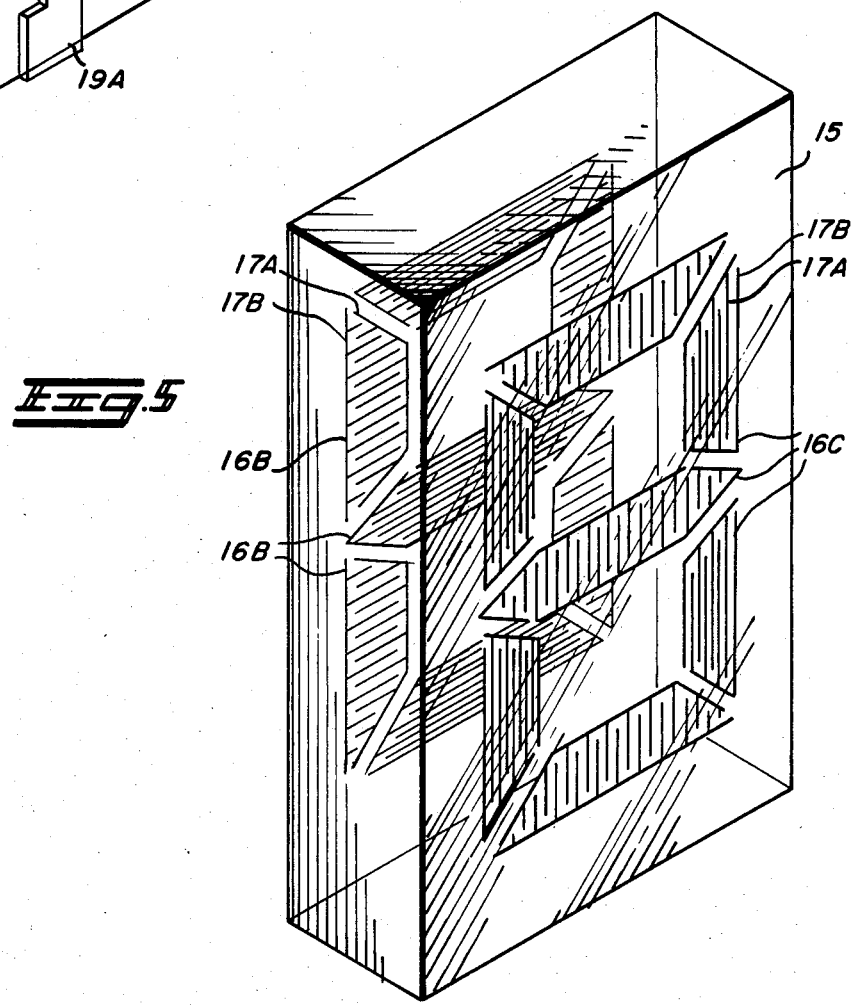
FIG. 5 is an enlarged perspective view illustrating a set of electrodes on each major surface of the electrooptic element.

In FIG. 1D, the electrodes in pattern 16C on one surface of PLZT plate 15 are oriented differently, preferably perpendicular, to the electrodes in pattern 16B on the other surface of plate 15 (see FIGS. 5 and 6B). In display 104 voltage is applied to only one of electrode patterns 16B and 16C at any given time. Since differently oriented electric fields are produced depending upon which electrode pattern is activated, different phase retardations result causing different indicia colors. Thus, the same magnitude of voltage can be selectively switched between electrode patterns 16B and 16C to create different indicia colors.

In FIG. 1E, a color display 105 includes what can be considered a second stage consisting of a variable color filter PLZT plate 22, a fixed retardation plate 18, and a third polarizer 24 crossed relative to polarizer 13. The indicia generating or first stage of this color transmissive display consists of crossed polarizers 13 and 14, and PLZT plate 15 which carries electrode patterns 16A and 16B. This display produces polychromatic or colored indicia against a black background. Only light corresponding to the desired indicia can exit the first stage. This light will be polychromatic if approximately half wave voltage is applied to electrodes 16A and 16B, or will be a colored selected light if a greater voltage is applied. With no voltage applied to electrodes 22a and 22b on PLZT plate 22, the character defined by PLZT plate 15 is viewed by the observer as a color character on a dark background; the color of the character is determined by the spectrum of light passed by the first stage and any further color filtering due to fixed retardation plate 18 in the second stage. By applying voltage to electrodes 22a and 22b, PLZT plate 22 can provide additional phase retardation and hence selective vary the color of the viewed character by the color filter characteristics of the second stage.

Another embodiment 106 of a two-stage device is depicted in FIG. 1F, in which a second stage (PLZT plate 26 disposed between crossed polarizers 13 and 24) can be used as an optical "ON/OFF" switch by utilizing PLZT plate 26 as a light shutter or modulator which is controlled by applying appropriate voltages. The first stage (elements 14, 15, 18 and 13) functions identically to display 101. This results in a two-stage color transmissive display 106 which permits ON/OFF control and permits the intensity of the colors exiting the first stage to be varied by selectively applying appropriate voltages to electrodes 26a and 26b.

In FIG. 1G color is achieved by using a special "leak" type polarizer 30 such as a NPF-Q-10R available from Nitto Denko America Incorporated, Lake Success, N.Y., which is crossed with linear polarizer 14 and in optical series with the PLZT plate 15. The special leak polarizer 30 has a spectral non-linearity in that a portion of the visible spectrum is not polarized so that said portion is not cancelled. The particular color of the viewed indicia is a function of the specific polarizer 30 selected.

In FIG. 1H, a conventional fixed color filter 32 is placed in series between the light source 12 and the polarizer 14. Alternatively, the light source 12 may be a colored light source, in which case the fixed color filter 32 is not required. Crossed polarizers 14 and 13, and the indicia controlling PLZT plate 15 in display 108 function as an indicia shutter. Thus, when the shutter is OFF, the display will be black; when the shutter is ON, colored indicia corresponding to the color of filter 32 against a black background will be seen.

FIGS. 2A through 2H represent embodiments 201-208 of reflective-type electrooptic displays. Reflective displays 201-208 correspond with transmissive displays 101-108, respectively, except that light source 12 is omitted, another source of light 21 such as ambient light is utilized, and an appropriate reflective surface 10 is added. Each of the reflective embodiments 201-208 function analogously and produce the same type of output display as embodiments 101-108, respectively.

For example, in display 201, light from source 21 is polarized by polarizer 13, is phase retarded by retardation plate 18 such as a full wave red plate, and is passed without phase retardation by PLZT plate 15, assuming no voltage is applied to electrodes 16A and 16B. The red phase shifted light exiting plate 15 is passed by crossed polarizer 14 and reflected by diffuse, non-depolarizing surface 10. This reflected red light now passes left to right through polarizer 14, plate 15, is again phase retarded by plate 18 and is passed by polarizer 13 to yield a deep red display background. Applying a voltage to PLZT plate 15 to define the desired indicia causes the light passing through the activated electrode regions to be phase retarded when passing through the PLZT plate in each direction. Thus, the indicia is displayed as a different color such as green against the deep red background. Embodiment 201 displays different colored indicia against a colored background just as does embodiment 101. In each embodiment 201–208, the reflective color displays operate on light reflected by reflector 10 to produce an output display similar to the corresponding embodiments depicted in FIGS. 1A through 1H, in which like reference numerals refer to like elements.

FIGS. 3A through 3H illustrate embodiments 301–308 of transflective-type displays which function analogously to corresponding embodiments 101–108 and 201–208, respectively. Each transflective display includes a "half-silvered" reflector 11 which permits a portion of the light from source 12 to pass therethrough and reflects a portion of the light from source 21. When light source 12 is substantially greater in magnitude than source 21 such as in a dark ambient environment, each embodiment 301–308 operates like embodiments 101–108, respectively. When light source 21 is substantially greater in magnitude than source 12 such as in high ambient lighting or sunlight, embodiments 301–308 operate like embodiments 201–208, respectively. When the magnitude of sources 12 and 21 are similar, the principle of superposition can be applied since both transmissive and reflective effects combine to produce the resultant display. Regardless of the relative magnitudes of the light sources 12 and 21, the same type of color display output is produced as in either of the corresponding transmissive or reflective embodiments.

Figure 4:
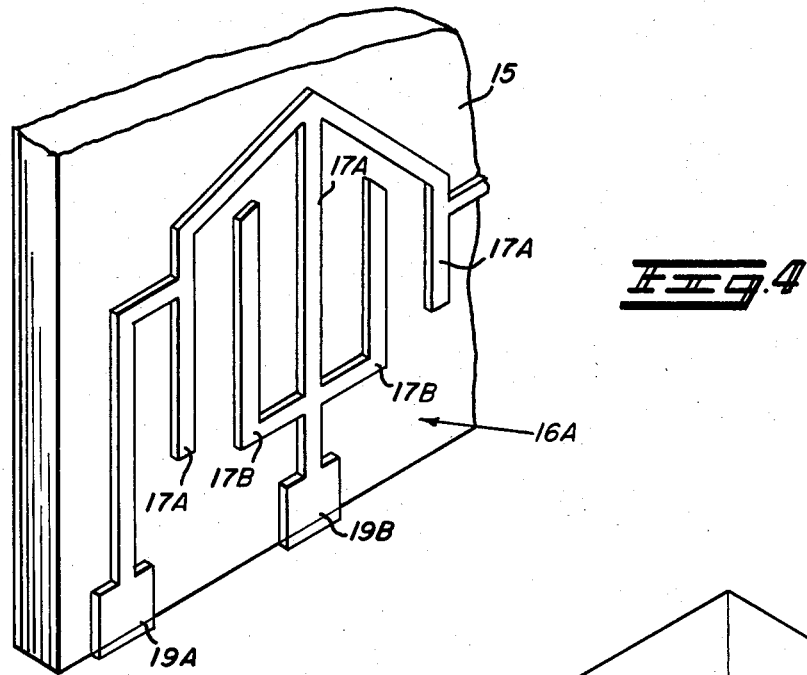
FIG. 4 is an enlarged partial, perspective view illustrating electrodes disposed on one surface of an electrooptic element.

In FIG. 4, a representative portion of the transparent interleaved electrode pattern 16a is shown disposed on PLZT plate 15. The electrodes which define the indicia may comprise interpenetrating parallel fingers 17a and 17b; the illustrative alternating fingers are spaced apart an equal distance. The electrode patterns on one surface of the PLZT plate preferably consist of fingers that are all aligned in parallel relationship such as in a horizontal orientation, a vertical orientation, or at some angle. This facilitates an equal retardation effect for each portion of the indicia during the operation of the display. However, the orientation of the fingers relative to the polarization axis or vector of the polarizers on either side of the PLZT plate must be considered in order to produce optimum indicia definition. For example in display 101, the electrodes are horizontal resulting in a vertical electric field, and are 45° relative to the polarization vector of crossed (90°) polarizers 14 and 13.

The transparent fingers may be made from an indium-tin-oxide (ITO) composition which is deposited in a manner so that the electrode on each surface of the PLZT plate 15, is on the order of 500–5,000 angstroms thick, depending on the desired resistivity of the electrode.

If electrode patterns 16a and 16b are in precise alignment with each other through the PLZT plate 15, the corresponding fingers on each side of the PLZT plate preferably have the same polarity and may be connected to a voltage source by connecting pads 19a and 19b. Adjacent fingers in each such electrode pattern have opposite polarity voltage applied.

Since an electrical field is defined as voltage divided by the distance between the potential, the closer the spacing between fingers, the greater the electric field for operating the PLZT plate for a given voltage. Thus, closely spacing the fingers is advantageous since it permits lower voltages to be used. By using electrodes with varying spacings, the resulting electrical field will vary correspondingly assuming a constant applied voltage. With a sequentially increasing electrical field, the resulting retardation will become correspondingly greater resulting in a continuously varying color. A PLZT plate having a thickness of approximately 15.0 mils with electrode spacings of about 2.5–3.0 mils has proved suitable.

Figure 9A:
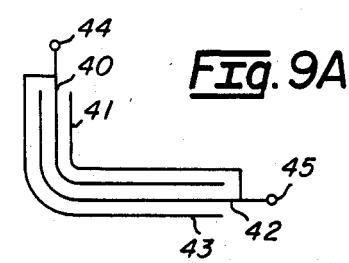
FIGS. 9A through 9F illustrate various types of electrodes which can be disposed on a ferroelectric ceramic plate to induce an electric field.

FIGS. 9A–9F show various types of electrode patterns wherein each pattern consists of fingers uniformly spaced apart. In FIG. 9A, finger portions 40 and 41 are orthogonal to portions 42 and 43; thus corresponding orthogonal electric fields are generated when a voltage is applied between terminals 44 and 45. The PLZT plate to which such an electrode pattern is mounted will cause differently oriented phase retardation of light passing through the differently oriented electric fields.

Figure 9B:
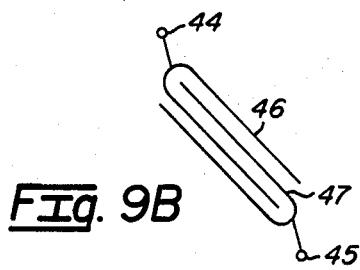
Figure 9C:
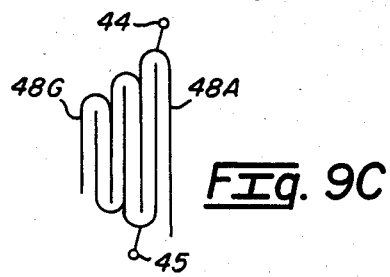

FIG. 9B illustrates electrode fingers 46 and 47 of equal length which are uniformly spaced apart. FIG. 9C shows fingers 48a–48g with sequentially decreasing lengths which define a trapezoidal electrode pattern.

Figure 9D:
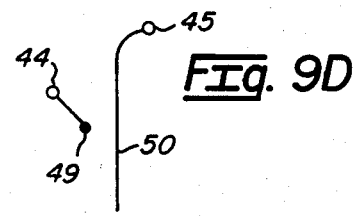
Figure 9E:
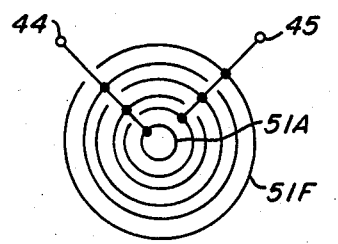

The electrode pattern in FIG. 9D comprises a point or circular electrode 49 adjacent a line electrode 50. Since the electric field will vary in both magnitude and orientation for different paths therebetween, a spectrum of colors will result.

The concentric electrodes 51a–51f define a circular pattern wherein the magnitude of the electric field between adjacent electrodes is equal; however the vector orientation of the field varies 360° about the center of this pattern and will produce corresponding color variations.

Figure 9F:
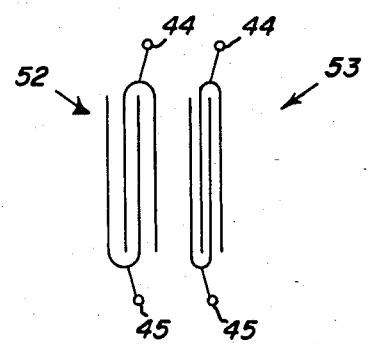

In FIG. 9F electrode patterns 52 and 53 each have parallel fingers spaced apart uniformly but the spacing in pattern 52 is greater than in pattern 53. Thus, pattern 53 will produce a larger magnitude electric field than pattern 52 and hence different colors or shades of a color will result.

Figure 10A:
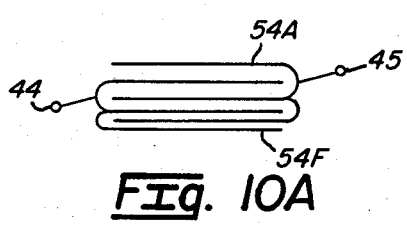
FIGS. 10A through 10B illustrate electrodes having non-uniform spacings which can be used to induce correspondingly varying electric fields on a ferroelectric ceramic plate.
Figure 10B:
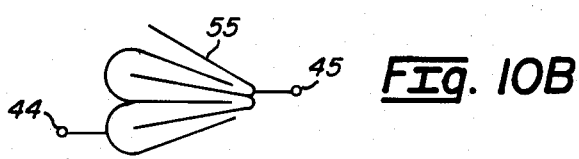

The electrode patterns in FIGS. 10A–10B illustrate various types of non-uniformly spaced fingers within a given pattern. In the pattern of FIG. 10A, parallel fingers 54a–54f are consecutively spaced closer and closer together such that greater and greater electric fields will result. This will produce a gradually changing color.

The pattern in FIG. 10B utilizes non-parallel radially divergent fingers 55 in which the spacing between adjacent fingers continuously increases along the length of the fingers. Thus the electric field between adjacent fingers will vary with the changing spacing therebetween and will yield corresponding color variations due to magnitude changes in the electric field. Additional color changes will occur due to orientation changes of the electric field resulting from different angular positions of the fingers.

In FIG. 5, an enlarged PLZT plate 15 has electrode patterns 16b and 16c disposed respectively on each of its major surfaces. The illustrative patterns consist of a 7-segment character with each corresponding segment area of electrodes 16b and 16c in alignment. The interleaved fingers 17a and 17b of electrodes 16c are perpendicular to the fingers of electrode 16b; this represents a PLZT plate suitable for operation in displays 104, 204, or 304. A PLZT plate in which fingers 17a and 17b in one electrode pattern are parallel to and in alignment with fingers 17a and 17b in the corresponding electrode pattern on the other surface of the PLZT plate would be suitable for use in embodiments having electrode patterns 16a and 16b.

FIG. 6A is an enlarged cross-sectional fragmentary view of a PLZT plate 15 having electrode patterns 16a and 16b with precisely aligned parallel fingers 17a and 17b which are connected to a DC voltage source 80 such that corresponding opposite fingers have the same polarity. An AC voltage source could also be used. A switch means which may include switch 81 can be used to selectively apply voltage to selected segments of the electrode patterns 16a and 16b. The transparent electrodes 16a and 16b produce surface birefringence (retardation) in the gaps between adjacent fingers since an electric field exists therebetween when a voltage source is connected. Connecting the opposite fingers of the electrodes in parallel allows the display to utilize a lower voltage and still have sufficient birefringence (retardation) to produce a bright, color display. As shown in FIG. 6a, each of the oppositely disposed activated segments induces electrical fields of the same polarity resulting in additive (cummulative) retardation. To achieve the same magnitude of retardation with electrodes on only one surface of the PLZT plate, a substantially higher voltage would be required. Each segment of the electrode patterns 16a and 16b have individual connections which permits each to be selectively connected to the voltage source by the switch means. When a segment, character or group of characters is activated by connecting same to the voltage source with like electrodes on both surfaces being electrically connected in parallel, a transverse electrooptic effect (i.e., the electric field perpendicular to the light propagation direction) occurs in and near the major surfaces of the PLZT plate.

FIG. 6b illustrates the electrical connection of the transparent electrode patterns 16a and 16b deposited on each major surface of the PLZT plate 15 and oriented in perpendicular alignment with each other as generally shown in FIG. 5. This structure operates to produce a desired color effect by applying an electrical field to selected segments on only one surface of the PLZT plate at a given time. Applying a voltage to one segment produces a certain color; applying the same voltage to the segment opposite said one segment produces a different color since an electric field with a different vector orientation results.

Figure 7:
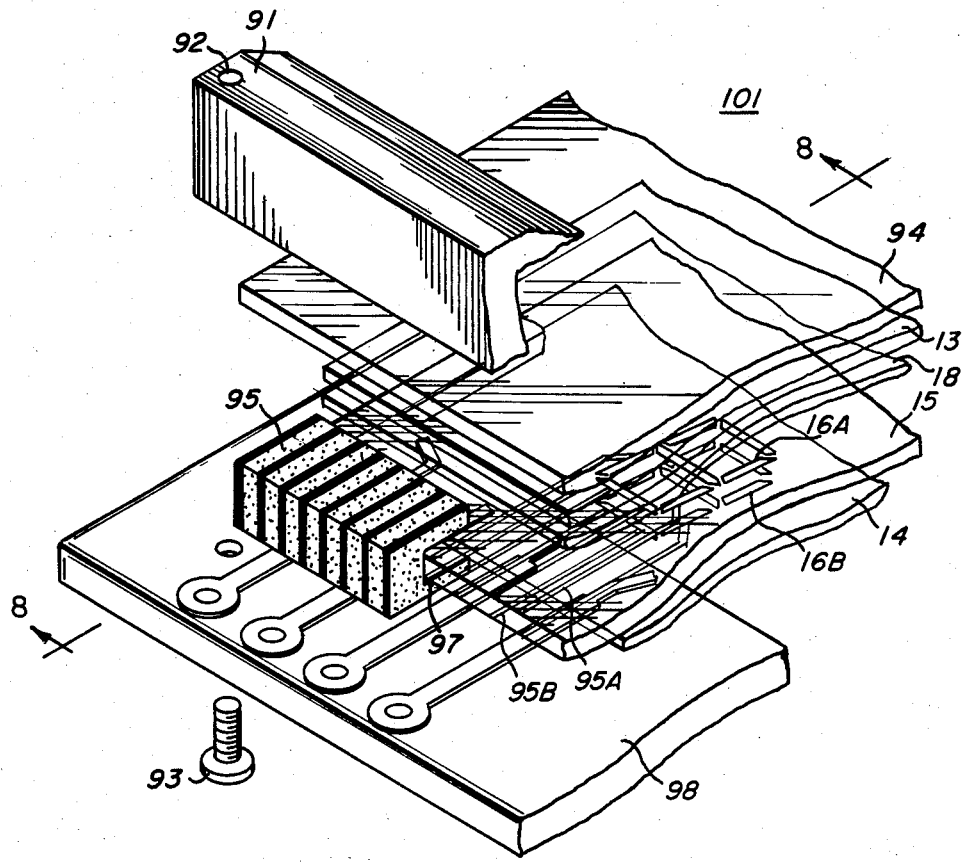
FIG. 7 is a partial exploded view of a display device in accordance with the present invention illustrating a mounting arrangement therefor.
Figure 8:
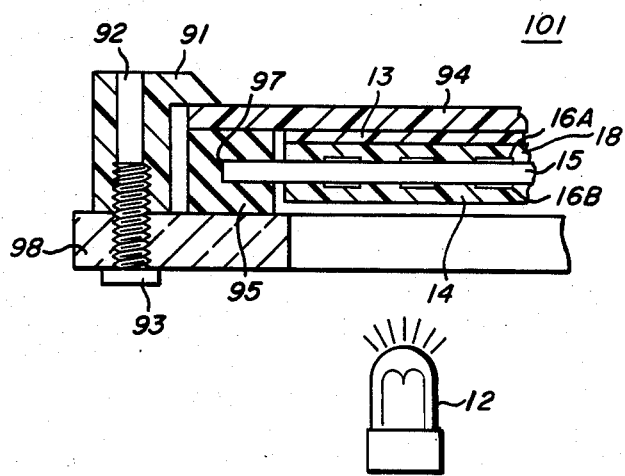
FIG. 8 is a cross-sectional view along line 8—8 of FIG. 7 illustrating that embodiment after same is assembled.

In FIGS. 7 and 8, an electrooptic transmissive display 101 utilizing the present invention is depicted. A retainer member 91 with an aperture 92 disposed to receive a fastening means 93 is assembled with a protective transparent shield 94 which protects and seals the reflective display 90 when assembled. The electrodes on each side of the PLZT plate 15 may be connected with conductive strips on an elastomer bar, or Zebra strip 95 which has been split along its length so that the PLZT plate 15 can be placed into the slot 97. The PLZT plate 15 may have an approximate thickness of 8-20 mils. When the elastomer bar is compressed by assembly of the retainer member 91, such will produce a simultaneous electrical connection between the top electrode pattern conductors 95A and the bottom electrode pattern conductors 95B on the PLZT plate 15 within the elastomer connector bar 95. Opposite corresponding segments of the electrode patterns 16a and 16b will be connected in parallel. Additionally, electrical connection is facilitated with an associated printed circuit board 98 by the conductive strips on the elastomer bar 95. The bar will also provide a seal from the top retaining member 91 to the lower associated printed circuit board 98, as well as provide for protection against vibration, and shock mounting of the PLZT plate within the display.

A top linear polarizer 13 is placed above a retardation plate 18, its bottom surface having a thin film of adhesive applied thereto. The top linear polarizer 13 is then placed on top of fixed retardation plate 18 which is mounted likewise to the top surface of PLZT plate 15. In a similar fashion, a bottom linear polarizer 14 is placed below the PLZT plate 15, its top surface having a thin film of adhesive applied thereto. The zebra elastomer connector bar 95 is mounted to the PLZT plate 15 to facilitate electrical connection of the electrodes 16a and 16b with each other and with the printed circuit board. Conventional solder connections can be made to the printed circuit board to connect the voltage source 80 and selective switching means 81 to the electrode patterns on the PLZT plate.

Experiments have led to the development of at least two methods of manufacturing the various embodiments of the electrooptic ceramic color display. In one method, the subtractive method, a plate of ferroelectric ceramic material, like PLZT, is prepared and cleaned for accepting a transparent electrode pattern on each surface of the plate. The fingers of each electrode pattern and associated connecting pads are defined on a set of photolithographic masks. Using the masks, photoresist is deposited uniformly on each surface in those areas where the pattern does not exist. After the photoresist is cured, a composition of conductive indium-tin-oxide is deposited on each surface of the plate so as to produce a distinct step pattern between the photoresist and the exposed plate. An acetone solvent is then applied to the plate to remove the undesired photoresist and the unwanted indium-tin-oxide composition. After the plate is dried, the resulting pattern is inspected and tested for desired electrical functionality. The plate, which now has the electrode pattern on each surface in precise alignment, is then assembled into the final display such as shown in FIGS. 7 and 8.

In another method, an additive method, a plate of ferroelectric ceramic material, like PLZT, is prepared and cleaned for accepting a transparent electrode pattern on each surface of the plate. A uniform layer of a conductive indium-tin-oxide composition is deposited on each surface of the plate by commercial sputtering equipment. The fingers of the electrode patterns and associated connecting pads are defined on a set of photolithographic masks. After the plates containing a layer of indium-tin-oxide composition are cleaned, a photoresist sensitive to ultraviolet light, is uniformly deposited on each surface of the plate. The set of photolithographic masks are positioned over each surface of the plate, and the photoresist is exposed. The resulting photolithographic transfer is developed by washing the exposed photoresist in a weak caustic solution. Since the PLZT material is a good absorber of ultraviolet light, the resulting developed patterns on each surface of the plate will be in precise alignment with each other through the plate. The plate is then rinsed, dried and then placed in an acid solution to etch away the indium-tin-oxide composition on each surface of the plate where the indium-tin-oxide material is not desired, leaving the electrode patterns in precise alignment with each other. The plate is then cleaned and dried. After the electrode patterns are inspected and tested for electrical functionality, the plate is then assembled into the final display.

Figure 11:
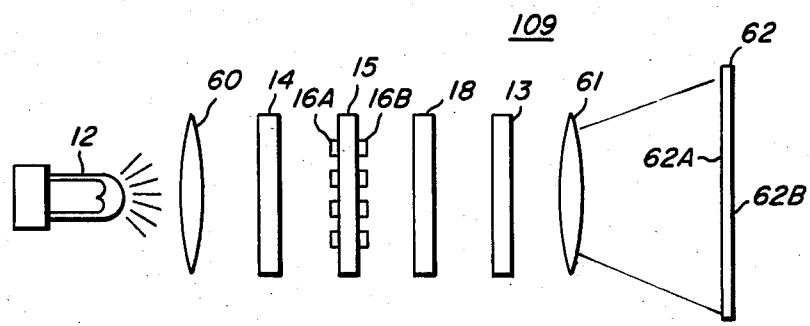
FIG. 11 illustrates a ferroelectric color projection display.

FIG. 11 illustrates an embodiment 109 of a projection color display which incorporates transmissive color display 101 therein. A collimating lens 60 is disposed between light source 12 and polarizer 14 to project parallel light rays towards the polarizer 14. Another lens means, such as lens 61, directs the light rays exiting polarizer 13 to impinge on viewing screen 62. The lens means may provide magnification if desired. Screen 62 may be opaque so that the observed image is seen on surface 62a or translucent such as a ground glass plate so that the projected image can be seen by viewing surface 62b. The color of the indicia and background is controlled by display 101 as described above. Although the exemplary projection display incorporates embodiment 101, any of the transmissive or transflective embodiments could be utilized.

Figure 12A:
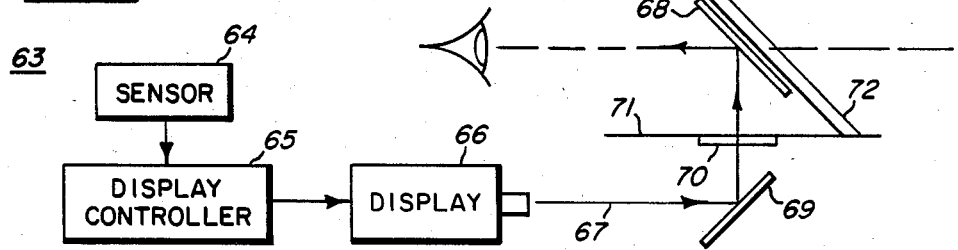
FIG. 12A is a diagrammatic view of a head-up projection display.

In FIG. 12A an embodiment 63 of a head-up projection display is shown which is suitable for use in a vehicle, such as an automobile or airplane to display information in the line of sight of the person controlling the vehicle. A sensor means 64 which may consist of known sensors is used to sense desired information useful to the person in control such as speed, direction, or operational characteristics of the vehicle. Signals representing parameters sensed by the sensing means 64 are coupled to display controller 65 which may comprise conventional circuits such as used to control 7-segment displays or a microprocessor. The controller 65 funtions to control the characters or image 67 projected by a projection display 66. Preferably display 66 is a color ferroelectric display as described above.

Image 67 is projected onto a viewing screen 68 such as by reflecting the image from display 66 by a reflector 69 through a transparent port 70 in a dashboard 71 located beneath windshield 72. Viewing screen 68 preferably consists of a substantially transparent plate made of a material having a high index of refraction, i.e. n>2.0. A ferroelectric ceramic plate made of PLZT material (n=2.5) having a thickness of less than 0.025 inches has proved advantageous. The high index of refraction and the thinness of the plate combine to minimize the multiple image problem caused by undesired refractions and reflections in the viewing screen. The screen 68 may be mounted separate from the windshield 72 or mounted directly to it.

Figure 12B:
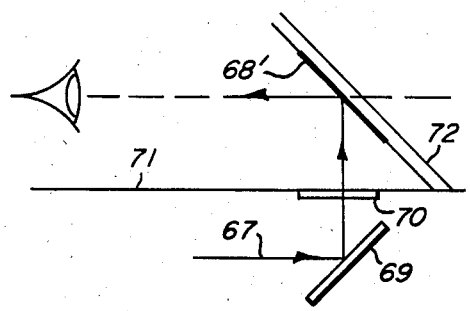
FIG. 12B illustrates an alternative viewing screen for a head-up display.

FIG. 12B illustrates that a viewing screen 68' may comprise a film of PLZT or other suitable material applied to windshield 72.

Figure 13:
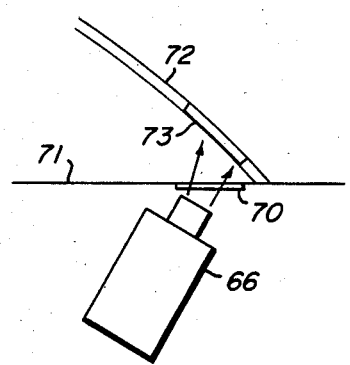
FIG. 13 shows a vehicular projection display using an opaque surface on the bottom edge of a windshield for the viewing screen.

FIG. 13 shows an alternate vehicular projection system in which a color ferroelectric projection display 66 projects an image onto an opaque portion 73 of windshield 72. In an automobile, the opaque portion may be disposed adjacent dashboard 71 so as not to obstruct the line of sight of the driver. The opaque portion may be formed by applying an opaque film or sheet to the windshield or integrally formed as part of the windshield. The display 66 may be controlled as shown in FIG. 12A.

Thus, there has been provided according to the present invention a novel, variable color electrooptic display with various embodiments corresponding to different modes of operation. Although the foregoing has been a description and illustration of specific embodiments of the invention, various modifications and changes thereto can be made by persons skilled in the art within the scope and spirit of the invention as defined by the following claims.

What is claimed is:

1. A method for creating selectable indicia of a first color and a second background color comprising the steps of:
   polarizing light emitted from a light source by means of a first polarizer;
   phase retarding selected portions of the polarized light exiting the first polarizer by applying a transverse electric field to selected areas on a substantially transparent uniaxial ferroelectric ceramic plate disposed in optical series with the first polarizer, said selected areas defining said indicia;
   polarizing the light which exits from the ferroelectric ceramic plate by means of a second polarizer; and
   providing additional phase retardation to light which exits from the first polarizer before said light strikes the second polarizer to provide a color bias, the additional phase retardation controlling the background color of the display and the combination of said additional phase retardation and the selected phase retarded portions of light controlling the color of the indicia.

2. The method according to claim 1 further comprising the step of selectively varying said additional phase retardation by controlling an electric field induced in a second ferroelectric ceramic plate disposed in optical series between the first and second polarizers, varying said additional phase retardation causing corresponding variations of the background color.

3. The method according to claim 1 wherein the polarization provided by the second polarizer further comprises the step of cross polarizing light striking the second polarizer relative to the polarization of the first polarizer.

4. The method according to claim 1 wherein the polarization provided by the second polarizer has the same polarization orientation as that of the first polarizer.

5. The method according to claim 1 wherein said second background color is not black.

6. The method according to claim 3 wherein said second background color is not black.

7. The method according to claim 1 wherein said second background color is not the color of the light emitted from said light source.

8. The method according to claim 4 wherein said second background color is not the color of the light emitted from said light source.

9. The method according to claim 1 wherein said step of providing additional phase retardation comprises providing additional phase retardation to all light traveling between said first and second polarizers.

10. An electrooptic display having selectable indicia of a first color and a background of a second color different from the first color comprising:
    a first and second polarizer;
    a substantially transparent uniaxial ferroelectric ceramic element having a first and second surface, and disposed between said first and second polarizers;
    means in addition to said element disposed between said first and second polarizers for providing spectrally selective phase retardation; and
    means for selectively inducing an electrical field at selectable areas on at least one of the first and second surfaces of said element, said electric field being transverse to the optical axis of the display and having a magnitude sufficient to cause spectrally selective phase retardation, said areas defining the indicia to be displayed, the phase retardation provided by said means for providing spectrally selective phase retardation defines said second background color, the cumulative phase retardation due to said induced field and said means for providing spectrally selective phase retardation defining said first color of the indicia.

11. The display according to claim 10 wherein said ceramic element consists of PLZT.

12. The display according to claim 11 wherein said PLZT ceramic element is a non-memory type and has large grain size.

13. The display according to claim 10 wherein said means for providing spectrally selective phase retardation comprises a wave plate.

14. The display according to claim 10 wherein said means for providing spectrally selective phase retardation comprises means for continuously varying the wavelength at which the phase retardation occurs to produce a continuously variable background color.

15. The display according to claim 14 wherein said varying means comprises another substantially transparent uniaxial ferroelectric ceramic element and means for inducing a variable electric field transverse to the optical axis of the display, the wavelength of the phase retardation caused by the eletric field induced in said another ceramic element varying with the magitude of the induced electric field.

16. The display according to claim 10 wherein said inducing means comprises a first and second set of electrodes disposed on said first and second surface of said ceramic element, respectively, and means for applying a voltage to certain electrodes in said first and second sets of electrodes.

17. The display according to claim 16 wherein said first set of electrodes are perpendicular to said second set of electrodes so that said first set of electrodes induces an electric field that is perpendicular to the electric field induced by said second set of electrodes, the electric field induced by said first set of electrodes producing a first phase retardation which results in one color of indicia and the electric field induced by said second set of electrodes producing a second phase retardation which results in another color of indicia different from said one color whereby said first color of the indicia is selectable between said one and another color.

18. The color display according to claim 16 wherein said first polarizer has a first polarization vector and said second polarizer has a second polarization vector which is substantially 90° relative to said first vector.

19. The display according to claim 10 where said first and second polarizers have first and second polarization vectors respectively, said first vector being substantially parallel to said second vector.

20. The color display according to claim 16 wherein said first and second set of electrodes are substantially transparent.

21. The color display according to claim 10 further comprising a third polarizer in optical series with said second polarizer, and another phase retardation means disposed between said second and third polarizers for providing additional phase retardation.

22. The color display according to claim 21 wherein said third polarizer has a third polarization vector which is oriented substantially 90° relative to the second polarization vector of said second polarizer, whereby said second and third polarizers and said retardation means defines an integral light modulator in optical series with said element.

23. The color display according to claim 10 further comprising a source of substantially polychromatic light disposed adjacent said first polarizer thereby defining a transmissive-type display.

24. The color display according to claim 23 further comprising a half-silvered plate disposed between said light source and said first polarizer for permitting a portion of light from said light source to pass therethrough and for reflecting a portion of ambient light entering the front of the display thereby defining a transflective-type of display.

25. The color display according to claim 10 further comprising a reflection plate disposed adjacent said first polarizer for reflecting light which passes through said first polarizer.

26. The color display according to claim 10 further comprising a source of light disposed to illuminate the surface of said first polarizer opposite said element, a viewing screen, and a lens means for directing light exiting said second polarizer onto said viewing screen.

27. The color display according to claim 26 wherein said viewing screen comprises a substantially transparent plate of ferroelectric ceramic material.

28. The color display according to claim 27 wherein said plate has an index of refraction greater than two.

29. The color display according to claim 28 wherein said plate is made of a PLZT material.

30. The display according to claim 10 wherein said second color is not black.

31. The display according to claim 18 wherein said second color is not black.

32. The display according to claim 23 wherein said second color is not the color of said polychromatic light.

33. The display according to claim 10 wherein said providing means provides phase retardation to all light traveling between said first and second polarizers.

* * * * *